J. F. Keller.
Fertilizing Mach.
N°. 31,084. Patented Jan. 8, 1861.
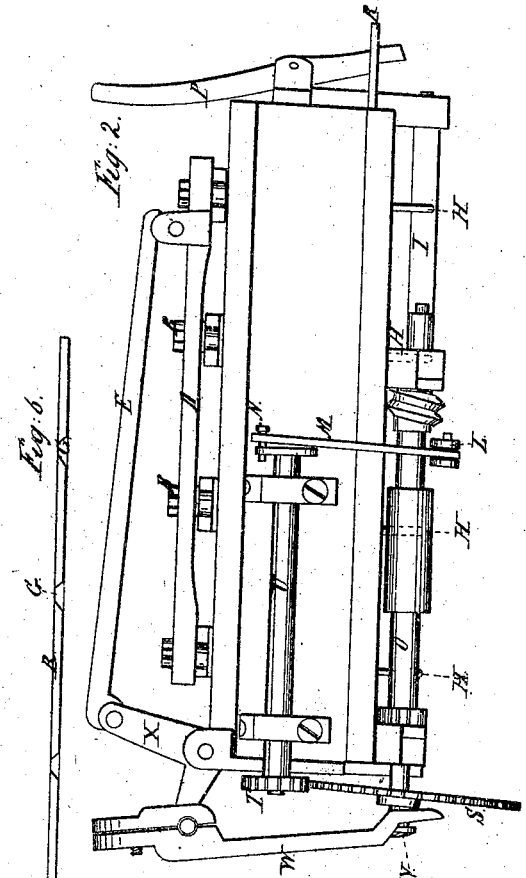
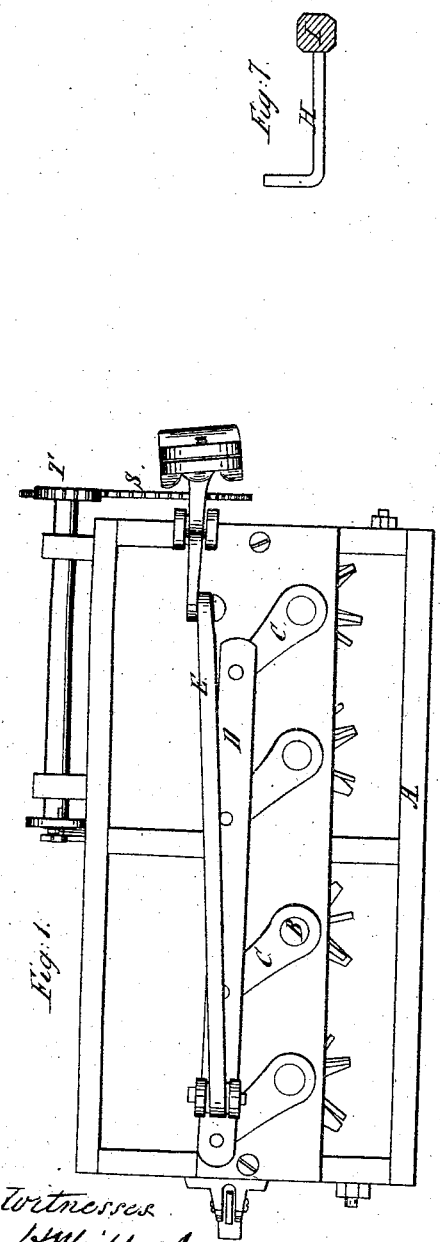
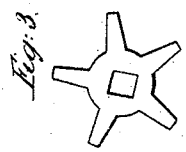
Witnesses
H. M. Gilbert
L. J. Bowen
Inventor
John F. Keller
by his Attorney Daniel Breca

UNITED STATES PATENT OFFICE.

JOHN F. KELLER, OF GREENCASTLE, PENNSYLVANIA.

IMPROVEMENT IN MACHINES FOR SOWING FERTILIZERS.

Specification forming part of Letters Patent No. 31,084, dated January 8, 1861.

*To all whom it may concern:*

Be it known that I, JOHN F. KELLER, of Greencastle, in the county of Franklin and State of Pennsylvania, have invented certain new and useful Improvements in Guano Attachments to Wheat-Drills; and I do hereby declare that the following is a full and exact description thereof, reference being had to the accompanying drawings, and to the letters of reference marked thereon.

In constructing machines for sowing guano it is found difficult to prevent the bridging and clogging of the machine. The greasy adhesive nature of the guano requires a certain amount of jar in the stirrer to render the feeding regular and complete. There must also be some arrangement of breakers to crush the hard lumps or bones occurring in most guano.

My invention consists in a peculiar and improved arrangement of stirrers, gearing, and clearers for guano attachment to wheat-drills.

In the accompanying drawings, Figure 1 is a top view of my improved guano attachment. Fig. 2 is an elevation of the same. Figs. 3, 4, 5, 6, 7 represent detached parts of the machine.

In the drawings, A represents the box or hopper into which the guano is put for sowing. In this hopper is a series of spike-rollers, B, for stirring the guano and breaking the lumps or bones of the same previous to its being scattered upon the ground. These rollers are turned forward and backward through a partial revolution by the cranks C, which receive reciprocating motion from the bar D and connecting-rod E, so that the guano is constantly agitated in the hopper. The guano passes through between these rollers in order to reach the discharge-openings. The lower end of each spike-roller has a socket, Fig. 3, having spikes beveled under at their sides, as seen in Fig. 4, which is a vertical section of one of these lower spikes. These beveled spikes ride upon the bottom of the hopper, and they sweep across the discharge-openings at every stroke of the rollers, the beveled spikes forcing the guano down through the discharge-openings, and thus keeping themselves free from adhesions of guano.

The slide R, Figs. 5 and 6, forms a part of the bottom of the hopper, and contains the discharge-opening G. These openings are made in a peculiar manner. The lower side of the slide is cut away so as to leave a sharp edge on the upper side, as seen in Fig. 6, for the purpose of preventing the holes from clogging. In order to insure the regular feed, and to guard against the possibility of clogging, I have arranged under the hopper a series of clearers, H, which play up and down in holes G. These clearers are operated by means of a rock-shaft, I, which receives motion from lever L, connecting-rod M, and crank N, as seen in Fig. 2. The length of this clearer H is seen in Fig. 7.

Motion is given to the machine by means of the shaft O, which may be set in motion by the traveling wheels in the usual manner. This shaft O carries a cog-wheel, S, which operates the pinion T and crank-shaft U, and also a crank, V, which gives motion to the connecting-rod W. The elbow X is connected with the rod W by means of a free-working collar provided with pivots at each side, so as to produce a universal joint of peculiar construction. By these means motion is communicated to the rod E, bar D, and rollers B. The rod E is made detachable from elbow X in order to stop the action of the rollers at pleasure. Thus whenever the driver wishes to stop the motion of the rollers he has only to lift the end of rod E from the elbow X; or the sowing of the guano may be stopped by placing the hand upon lever P, and thus moving the slide R; or the feed-openings may be partially closed in to regulate the feed.

I am aware that spiked stirrers are not new, and that most of the devices employed in the construction of my machine have been heretofore used. Therefore I do not broadly claim such devices; but I confine my claims to the peculiar construction and arrangement herein described.

Having thus fully described my invention, what I claim, and desire to secure by Letters Patent of the United States, is—

1. The arrangement of a series of spiked rollers B, when placed vertically and moved through a partial revolution by a reciprocating motion, substantially as set forth.

2. The use of the clearers H and the feed-slide R, Figs. 5 and 6, provided with the peculiar openings G, substantially in the manner and for the purposes described.

3. The arrangement of the removable connecting-rods E and W, in combination with elbow X and the universal joint, substantially as described, for the purposes specified.

JOHN F. KELLER.

Witnesses:
DANIEL BREED,
EDM. F. BROWN.